United States Patent [19]
Benker et al.

[11] Patent Number: 5,594,525
[45] Date of Patent: Jan. 14, 1997

[54] METHOD OF PRINTING PHOTOGRAPHS AND APPARATUS FOR CARRYING OUT THE METHOD

[75] Inventors: Gerhard Benker, Icking; Helmut Treiber; Ulrich Klüter, both of Munich; Bernhard Lorenz, Freising; Reimund Münch, Munich, all of Germany

[73] Assignee: AGFA Geavert, Munich, Germany

[21] Appl. No.: 450,822

[22] Filed: May 25, 1995

[30] Foreign Application Priority Data

Jun. 15, 1994 [DE] Germany .......................... 44 20 823.5

[51] Int. Cl.⁶ ................................................... G03B 29/00
[52] U.S. Cl. ................... 355/29; 355/50; 355/73; 355/77
[58] Field of Search .................................... 271/281, 283, 271/10.09, 10.14, 225, 184, 185; 355/54, 50, 51, 27–29, 73, 77, 40, 112

[56] References Cited

U.S. PATENT DOCUMENTS 4,174,174 11/1979 Hunter, Jr. et al. .................... 355/39

FOREIGN PATENT DOCUMENTS

| 0567166 | 10/1993 | European Pat. Off. . |
| 3017386 | 11/1980 | Germany . |
| 3343336 | 11/1983 | Germany . |
| 3817138 | 12/1988 | Germany . |
| 4126578 | 2/1993 | Germany . |
| 1470470 | 4/1977 | United Kingdom . |

*Primary Examiner*—Arthur T. Grimley
*Assistant Examiner*—Herbert V. Kerner
*Attorney, Agent, or Firm*—Furgang & Milde, LLP

[57] ABSTRACT

A method of and printer for printing photographs on light-sensitive paper of a particular format from transparent masters on a roll of film by means of a projector. Both the film and a strip of the paper are advanced through a printing point. The paper is displaced across the direction the film travels in with the center of the prescribed paper format at a distance from the optical axis of the projector. The projector can be adjusted to project the image of the master larger or smaller than the paper format.

16 Claims, 5 Drawing Sheets

METHOD OF PRINTING PHOTOGRAPHS AND APPARATUS FOR CARRYING OUT THE METHOD

BACKGROUND OF THE INVENTION

The present invention relates to a method and apparatus for exposing transparent masters onto light sensitive material in the form of individual sheets. Each sheet is positioned with respect to the exposure field in an image plane of an optical projection device such that the optical axis of the projection device passes next to the center of the sheet.

Both professional and amateur photographers have increasingly felt the need to print enlargements of only details of the original negatives or diapositives (masters). Another increasingly frequent demand is for the ability to print index prints, which are sheets of miniatures of all or several of the masters on one film. Index prints have in the past been contact printed onto black-and-white paper in the photographic laboratory. They are useful for filing and as proofs that allow customers to select final photographs for purchase. Contact prints, however, are not made available by many laboratories because they require a lot of expensive labor.

Some recent printers intended for professional photographers include film supports mounted on an X-Y carriages. These carriages, however, are very complicated and expensive and cannot be employed in high-output printers wherein several rolls of film are fastened end-to-end into a strip that travels through the printing station. Since the films in this type of printer are wound off a reel upstream of the printing point and wound onto another one downstream of that point, it is practically impossible to displace the strip in a direction transverse to the direction it travels in.

The German Patent Publication No. OS 3,343,336, in FIG. 8, discloses a device for positioning a light-sensitive individual sheet with respect to the exposure field in an image plane of an optical projection device such that a plurality of images on a photographic film can be successively exposed in this sheet. However, this device uses an X-Y carriage which is both complicated and expensive.

SUMMARY OF THE INVENTION

A principal object of the present invention is accordingly to provide a simple method of printing both enlarged details and index prints from photographic masters. Another object is to provide apparatus than can be employed to implement this method.

These objects, as well as other objects which will become apparent from the discussion that follows, are achieved, in accordance with the present invention, by a method wherein the light-sensitive sheet is rotated by a prescribed angle about a first point in the image plane and thereafter rotated about a second point in this plane.

The method results in a relative motion between the film and the paper that allows a master or a particular area thereof to be printed anywhere within the format of the paper being employed. The relative position of the film and paper can even be programmed to allow complete automation of the index-printing process. The scales of the enlargements on the other hand should still be manually selected to take advantage of the individual photographer's ability to skillfully intervene.

With film and paper traveling parallel as in conventional printers as the point of departure, equipment wherein the paper is trimmed into separate sheets before entering the printing point is particularly appropriate for the method. The German Patent Publication No. OS 4,126,578 discloses a photographic printer wherein the paper on the paper support is already in sheets. The paper support is provided with means of rotating each sheet. Both landscape and portrait formats can accordingly be printed, with the width of the strip representing either the length or the width of the image.

In a printer of this type, however, the paper can only be positioned equivalent to a displacement perpendicular to the direction the film travels in by rotating the sheet around various axes. The sheet is initially rotated around its center for example, subsequent to which either the axis of rotation is displaced in relation to the sheet or the sheet in relation to the axis along the regular direction of travel to establish a new axis of rotation and the sheet is rotated backward around the new axis. The sheet can then be advanced in the regular direction of travel until the desired area enters the area of exposure.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
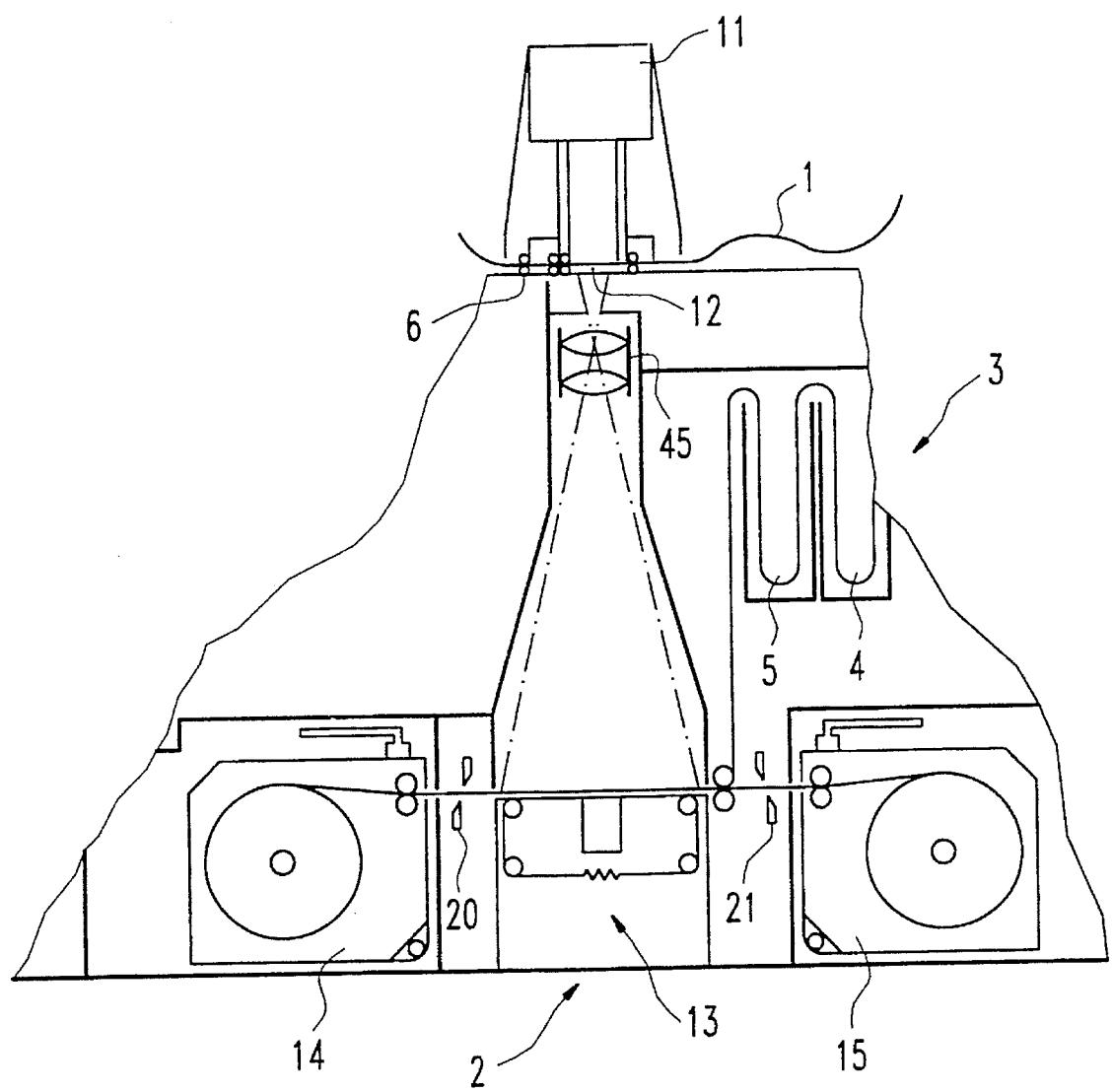
FIG. 1 is a side elevational view of the printing station of a printer designed to carry out the method in accordance with the present invention.

The preferred embodiments of the present invention will now be described with reference to FIGS. 1–8 of the drawings. Identical elements in the various figures are designated with the same reference numerals.

FIG. 1 illustrates the printing station 2 in a small laboratory wherein individual sheets of photographic paper are exposed and developed. A developing section 3 is indicated by chemical tanks 4 and 5. Printing point 2 comprises a projector 11, a support 12 for securing and rollers 6 for advancing film 1, a zoom lens 45, a paper support 13, and paper-advancing mechanisms, including cassettes 14 and 15.

To print in various formats without replacing cassettes 14 and 15, the cassettes are loaded with paper of different widths. Paper is displaced over paper support 13 from the cassette appropriate for the particular format and cut to size by a paper cutter 20 or 21. The exposed sheets of paper are removed from paper support 13 and forwarded in an unillustrated and unspecified way to the tanks in developing section 3. The developed sheets subsequently travel through an unillustrated drier and are stacked at a receiving point.

Figure 2:
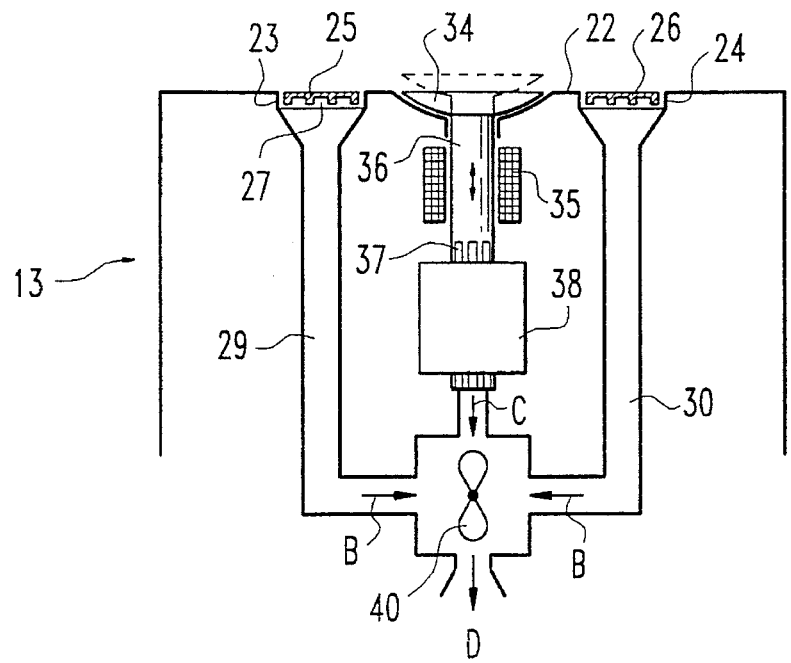
FIG. 2 is an enlarged vertical sectional view of the means for locating and changing the orientation of discrete photographic paper sheets in the printing station of FIG. 1.
Figure 3:
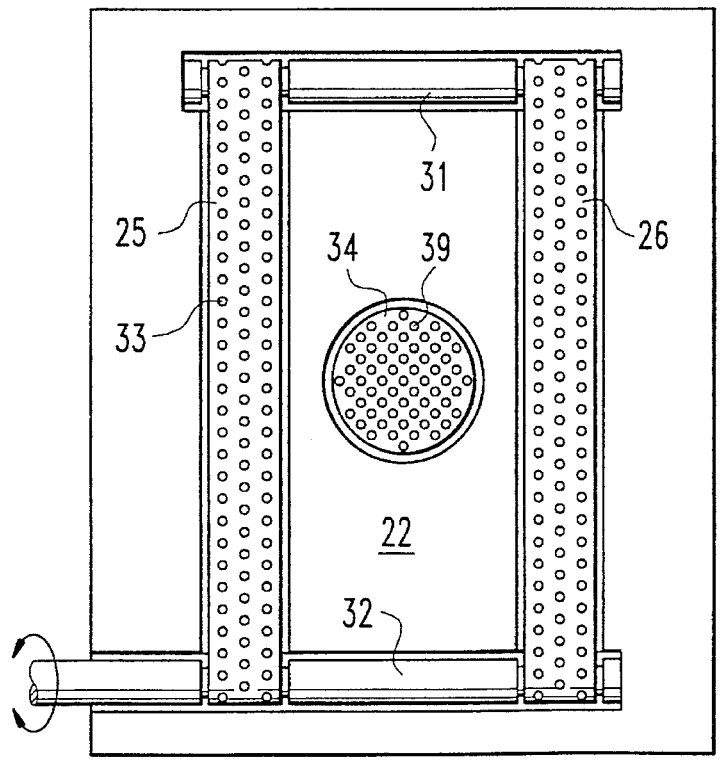
FIG. 3 is a plan view of the structure which is shown in FIG. 2.

As shown in FIGS. 2 and 3, the paper support 13 includes two endless belt conveyors 25 and 26 arranged in recesses or grooves 23 and 24. The belt conveyors are disposed with their upper surfaces in coplanar relationship with the upper side or surface 22 of the platform. This surface 22 is located in a predetermined plane at an optimum distance from the film frame on the film support 12 (FIG. 1).

The underside or inner side of each of the two conveyors 25, 26 (which can be made of rubber or a flexible plastic material) is provided with several (e.g. 3) endless channels 27 whose open sides are closed and sealed by the surfaces in the bottom portions of the respective grooves 23 and 24 so that each of these channels can convey air with a minimum of leakage. The surfaces in the bottom portions of the grooves 23, 24 are provided with slots which establish communcation between the channels 27 of the conveyor 25 and a suction duct 29, and between the channels of the conveyor 26 and a suction duct 30. The discharge ends of the ducts 29, 30 are connected to the respective inlets of a suction generating device 40 which is installed in, or on the paper support 13 and, when in operation, can draw air in directions indicated by the arrows B, B and C. As shown in FIG. 3, the conveyors 25, 26 extend around a common idler pully 31 and around a common drive pully 32 which can be driven clockwise as well as counterclockwise by a reversible motor (not shown).

The apparatus further comprises means for changing the orientation of a photographic paper sheet at the plane of the surface 22 of the paper support 13. The orientation changing means comprises a sheet turning platform 34 (hereinafter called a "turntable") which can be actuated by remote control to manipulate a sheet either prior or subsequent to imaging of a film frame. The turntable 34 has suction ports 39 which attract a sheet when the suction generating device 40 is on and the path for the flow of air from the ports 39 to the correspondin40 (arrow C in FIG. 2) is unobstructed. The conveyors 25 and 26 also have rows of suction ports 33 which communicate with the respective channels 27 and enable the conveyors to attract the adjacent portions of a sheet when the suction generating device is on and the paths for the flow of air from the ports 33 to the respective inlets of the device 40 (arrows B in FIG. 2) are at least partially unobstructed.

The orientation changing means of the apparatus of FIGS. 1 to 3 further comprises an elevator for the turntable 34 and means for rotating the turntable about an axis which is normal to the plane of the surface 22. The elevator for the turntable 34 comprises an electromagnet 35 which surrounds a rotary and vertically reciprocable upright shaft 36 for the turntable 34. This shaft constitutes a means for raising or lowering the turntable 34 so that the upper side of the turntable is either flush with or is located at a level above the surface 22 of the printing support 13. The raised position of the turntable 34 is shown in FIG. 2 by phantom lines. The peripheral surface of the shaft 36 is provided with axially parallel alternating flutes and ribs 37 which mate with complementary ribs and flutes of a reversible electric motor 38 which is installed in or on the platform 13 and can rotate the turntable 34 back and forth (e.g., through angles of exactly 90 degrees) or in a single direction. The flutes and ribs 37 and the complementary ribs and flutes of the output element of the motor 38 enable the turntable 34 and its shaft 36 to move up and down while compelling the shaft 36 (and hence the turntable) to share the angular movements of the output element of the motor 38. The shaft 36 has one or more substantially axially extending bores or holes (not specifically shown) which enable atmospheric air to flow from the ports 39 of the turntable 34 in the direction of arrow C and into the correspnding inlet of the suction generating device 40. Air which is drawn into the device 40 in tharrows B and/or arrow C is discharged through an outlet of the device 40 in the direction of arrow D. The lower end of the shaft 36 can be slidably and sealingly telescoped into the corresponding inlet (arrow C) of the housing of the suction generating device 40.

Figure 4:
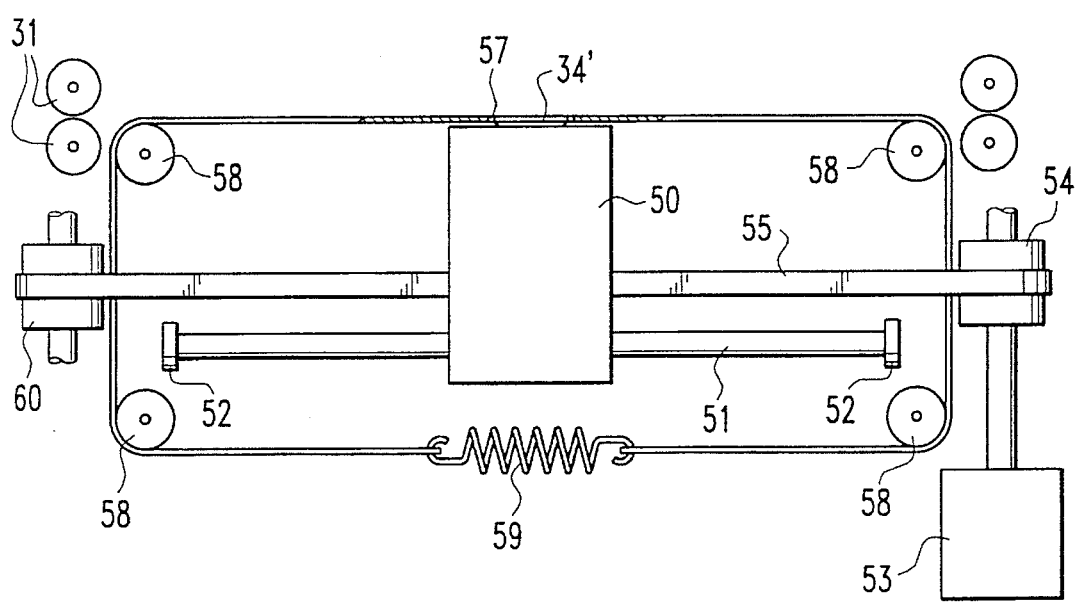
FIG. 4 is a side elevational view of a preferred embodiment of the paper support in the printer illustrated in FIG. 1.

The paper support 13 illustrated in FIG. 4 allows sheets cut from a strip of light-sensitive paper to be rotated as desired. The turntable 34 is accommodated along with an unillustrated drive mechanism in a carriage 50. Carriage 50 is driven back and forth along rods 51 between stops 52 by a motor 53 and by way of a drum 54 and a cogged belt 55. Belt 55 is stretched between driving drum 54 and a belt-deflection drum 60. Secured to carriage 50 is another belt 56. Belt 56 includes a slot 57 that accommodates turntable 34. The surface of belt 56 is flush with that of turntable 34. Belt 56 travels around pulleys 58 over the bottom of the paper support. The belt is not continuous, and its ends are connected by a spring 59, which facilitates installing and removing it.

Belt 56 positions carriage 50 at one of stops 52 to accommodate a single sheet. When turntable 34 is disposed below the paper, an unillustrated suction pump in carriage 50 is switched on. Carriage 50 is moved into the exposure position with the paper subjected to the suction. The sheet can now be exposed at the desired format or rotated 90° by turntable 34. If the suction is powerful enough, there will be no need to lift the turntable while it is being rotated. Once the sheet is positioned for exposure, it is suctioned flat to the paper support. The contact surfaces on each side of the belt are provided with air openings for this purpose. Belt 56 itself can also have such openings.

Figure 5:
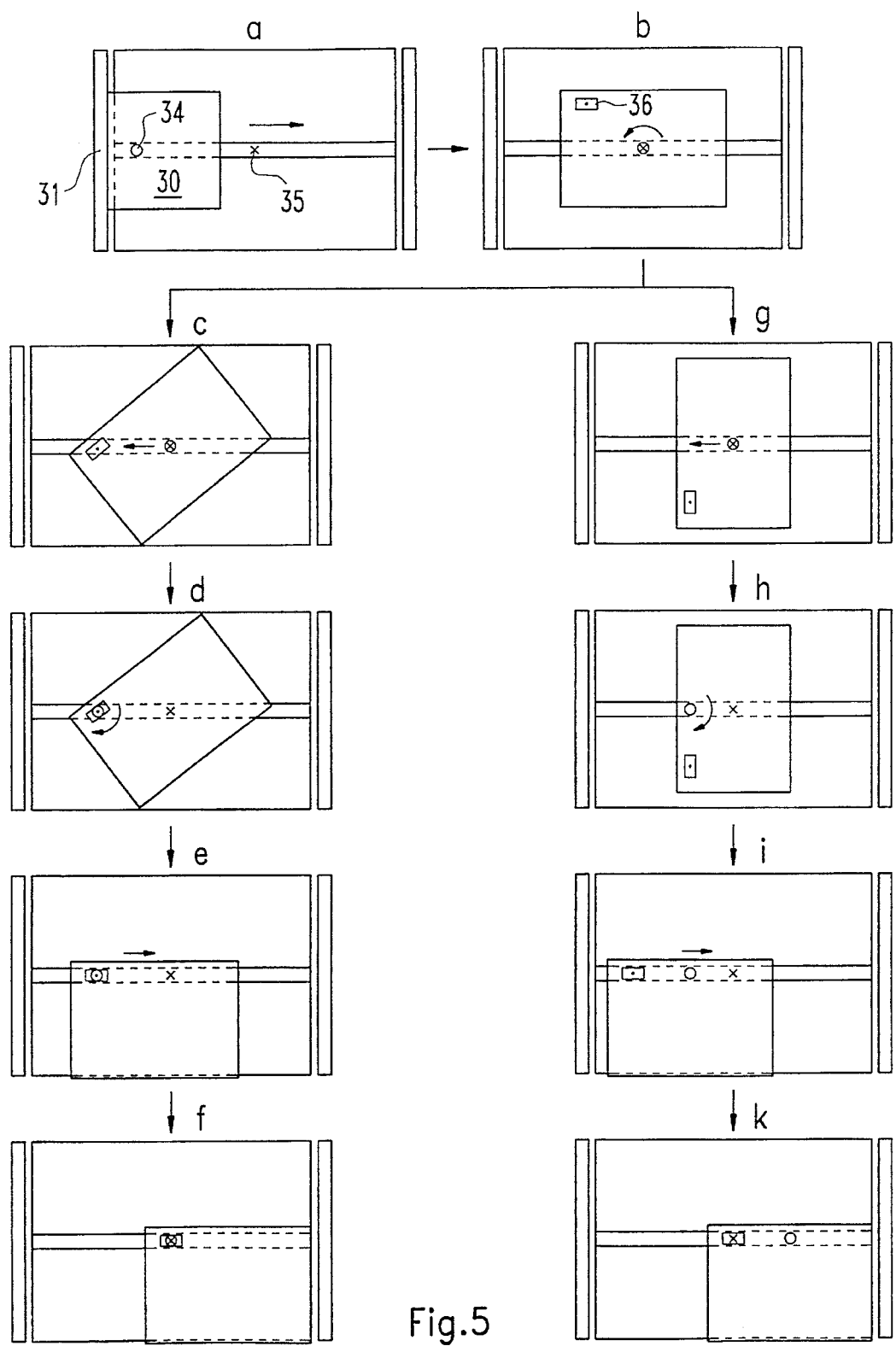
FIG. 5, consisting of FIGS. 5a–5b, illustrates two ways of carrying out the method according to the present invention.

FIG. 5 illustrates two ways of employing the printing point just specified to print index prints, package prints, or enlarged details practically anywhere on the sheet by positioning any point on the sheet coincidental with the optical axis of zoom lens 45. FIG. 5a illustrates how turntable 34 takes a sheet 30 from paper-advancing rollers 31. Once the turntable has secured the sheet by suction, it positions it on the support with its center at the optical axis 35 as illustrated in FIG. 5b. A rectangle 36 represents one area by way of example that an individual master can be projected onto to print one of the images in an index print and that must accordingly be positioned at the center of the paper support. One way of doing so is illustrated by FIGS. 5c, 5d, 5eand 5f.

With the situation illustrated in FIG. 5b as a point of departure, sheet 30 is rotated 90° into the position illustrated in FIG. 5g. Suction is discontinued and the sheet is released from turntable 34 and displaced perpendicular to rectangle 36 as illustrated in FIG. 5h. Suction is reestablished and sheet 30 rotated back 90° into the position illustrated in FIG. 5i. Turntable 34 now moves along with sheet 30 until the center of rectangle 36 is at optical axis 35 again as illustrated in FIG. 5k. This final position differs from that illustrated in FIG. 5f in that turntable 34 does not coincide with the optical axis, which can have hardly any negative consequences.

If the paper support is large enough, it will be possible to draw the sheet 30 far enough onto the support while it is being transferred from paper-advancing rollers 31 to the turntable 34 for it to arrive at the optical axis even during the first rotation around the center of rectangle 36. In this way the turntable needs only to be returned to the optical axis to rotate the sheet back. Nothing else needs to be done in the present case.

To further accelerate the positioning procedure the rotation and displacement of the turntable can be parallel instead of serial.

Any point on a sheet of paper can be positioned at the optical axis in the same way, and how the procedure can be applied point by point will accordingly not be specified.

The method heretofore specified provides a wide range of potential. An index print of the type specified with respect to FIG. 6 can be produced from a film 1 of the type illustrated in FIG. 1 for example. In this event the area intended for the first image is positioned at the optical axis by one of the procedures specified with reference to FIG. 5. Once that first image has been projected, the paper will only need to be displaced and not rotated to project the second through sixth images. Only when the seventh through twelfth images, in the second row, are to be projected, will the paper need to be rotated around two different points again. A move from one row to another can always be executed in this way and the whole row of images projected.

To facilitate re-ordering in particular, it is reasonable to associate with each image a code, which can be read off the film, for each master. Such a code can be printed from an LED array for example.

Figure 7:
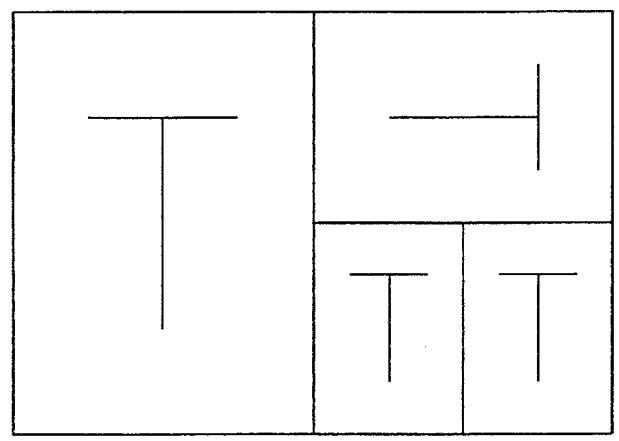
FIG. 7 is a package print printed in accordance with the present invention.
Figure 8:
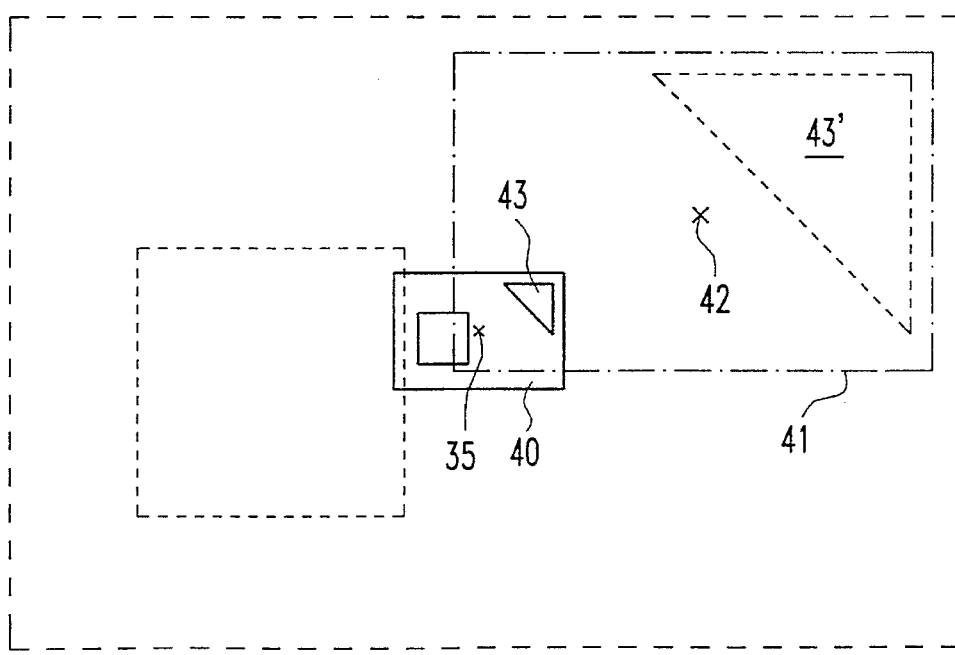
FIG. 8 is a schematic representation illustrating how an enlarged detail is printed in accordance with the present invention.

A package print of the type illustrated in FIG. 7 can be printed similarly. In this event the center of each eventual image is positioned at the optical axis and the scale of magnification adjusted by raising or lowering zoom lens 45. These procedures are programmed.

The separate images are projected from the same master. It is also possible to store several package-print programs.

Figure 6:
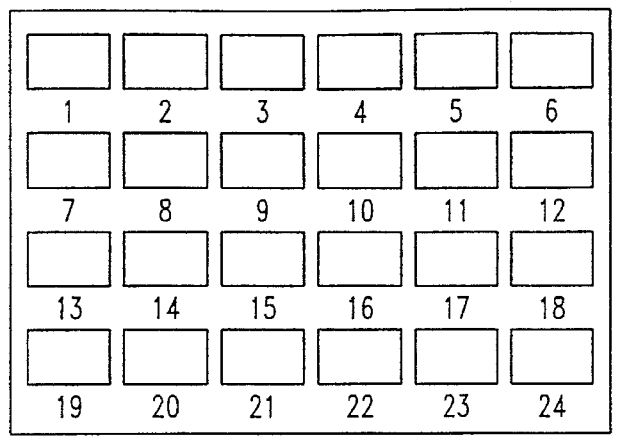
FIG. 6 shows an index print printed in accordance with the present invention.

Another application for the method in accordance with the present invention is for printing enlarged details. FIG. 6 illustrates a master 40 with optical axis 35 extending through its center. The master's enlarged image is represented on the paper support by the broken lines. A sheet of light-sensitive photographic paper is now positioned as heretofore specified with its center 42 at some distance from optical axis 35. The particular distance and the direction of displacement depend on both the particular detail and on the scale of the enlargement. In the subsequent printing process only the enlarged image 43' of the triangular area 43 of master 40, for instance, is projected onto sheet 41.

There has thus been shown and described a novel method for printing photographs and apparatus for carrying out the method which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A method of exposing transparent masters onto light-sensitive material in the form of individual sheets, wherein each sheet is positioned with respect to the exposure field in an image plane of an optical projection device such that the optical axis of the projection device passes next to the center of the sheet, said method comprising the steps of:

(a) rotating the sheet by a prescribed angle about a first point in the image plane; and (b) rotating the sheet about a second point in the image plane.

2. The method defined in claim 1, wherein the sheet is rotated in step (b) in the same direction as in step (a).

3. The method defined in claim 1, wherein the sheet is rotated in step (b) in the opposite direction as in step (a).

4. The method defined in claim 1, wherein the sheets are conveyed in a plane along a midline and wherein the first point lies on said line.

5. The method defined in claim 4, wherein the sheet is rotated around the first point until the point at which the optical axis of the projection device should intersect the sheet after the paper has been positioned but before it has been exposed will be on the midline of the plane the paper is being conveyed along.

6. The method defined in claim 5, wherein a plurality of prints of a single master are produced on a single sheet.

7. The method defined in claim 6, wherein the prints are produced in various exposure scales.

8. The method defined in claim 5, wherein a plurality of prints from various different masters are produced on a single sheet.

9. The method defined in claim 8, further comprising the step of electronically imaging a picture number for each individual master.

10. The method defined in claim 8, further comprising the step of electronically imaging a film identification number on the sheet.

11. The method defined in claim 5, wherein a particular region of an individual master is imaged with enlarged exposure scale on an individual sheet.

12. In photographic printing apparatus for exposing transparent masters onto light sensitive material in the form of individual sheets with a positioning device for the light sensitive material, said positioning device causing a displacement of the sheet in two respectively perpendicular directions within the image plane of an optical imaging device, the improvement comprising (a) means for rotating the sheet and (b) control means, coupled to the rotating means, for rotating the sheet by a prescribed angle about a first point in the image plane and for rotating the sheet about a second point in the image plane.

13. The apparatus defined in claim 12, wherein the sheet is rotated about the second point in the same direction as about said first point.

14. The apparatus defined in claim 12, wherein the sheet is rotated about the second point in the opposite direction as about said first point.

15. The apparatus defined in claim 12, wherein the sheets are conveyed in a plane along a line and further comprising a turntable at an imaging station which is both rotatable and movable in the direction of conveyance of the individual sheets.

16. The apparatus defined in claim 12, wherein the turntable is movable along said line in the plane of conveyance of said paper.

* * * * *

UNITED STATES PATENT AND TRADEMARK OFFICE
CERTIFICATE OF CORRECTION

PATENT NO.   : 5,594,525
DATED        : January 14, 1997
INVENTOR(S)  : Gerhard Benker et al.

It is certified that error appears in the above-indentified patent and that said Letters Patent is hereby corrected as shown below:

On the title page, Item [73] Assignee: delete "Munich" and substitute -- Leverkusen --

Signed and Sealed this

Twenty-second Day of April, 1997

*Attest:*

BRUCE LEHMAN

*Commissioner of Patents and Trademarks*

*Attesting Officer*